United States Patent
Nagy et al.

(10) Patent No.: US 9,851,218 B2
(45) Date of Patent: Dec. 26, 2017

(54) METHOD FOR PLANNING A ROUTE IN A SYSTEM WITH A DISPLAY AND AN INPUT DEVICE

(71) Applicant: GPS TUNER KFT., Budapest (HU)

(72) Inventors: Tamas Nagy, Debrecen (HU); Gabor Tarnok, Budakalasz (HU)

(73) Assignee: GPS TUNER KFT., Budapest (HU)

( * ) Notice: Subject to any disclaimer, the term of this patent is extended or adjusted under 35 U.S.C. 154(b) by 0 days.

(21) Appl. No.: 14/914,637

(22) PCT Filed: Aug. 7, 2014

(86) PCT No.: PCT/HU2014/000067
§ 371 (c)(1),
(2) Date: Feb. 26, 2016

(87) PCT Pub. No.: WO2015/022558
PCT Pub. Date: Feb. 19, 2015

(65) Prior Publication Data
US 2016/0209230 A1    Jul. 21, 2016

(30) Foreign Application Priority Data
Aug. 15, 2013   (HU) .................................. 1300490

(51) Int. Cl.
*G01C 21/00*   (2006.01)
*G01C 21/36*   (2006.01)

(52) U.S. Cl.
CPC ..... *G01C 21/3667* (2013.01); *G01C 21/3664* (2013.01); *G01C 21/3676* (2013.01)

(58) Field of Classification Search
CPC ............ G01C 21/3667; G01C 21/3664; G01C 21/3676
See application file for complete search history.

(56) References Cited

U.S. PATENT DOCUMENTS

2007/0260395 A1   11/2007   Matsuoka
2011/0022308 A1    1/2011   Britton
(Continued)

FOREIGN PATENT DOCUMENTS

JP    2000 111354 A    4/2000
WO    2014/067951 A1   5/2014

OTHER PUBLICATIONS

International Search Report issued in International application No. PCT/HU2014/000067, dated Jan. 19, 2015.

*Primary Examiner* — Adam Alharbi
(74) *Attorney, Agent, or Firm* — Handal & Morofsky LLC

(57) ABSTRACT

A method for planning a route in a system having a display and an input device, that comprises the steps of using a map database that stores data associated with an area that includes a required route; displaying the map or a portion thereof on the display, in this displaying step selecting the scale and position of the displayed map; adjusting and storing conditions or preferences as parameters associated with the required route; defining the requested route in which using said input device to draw the required route on the map displayed, storing the coordinate data of the required route; then determining a suggested route based on the required route, wherein an iteration algorithm is used to determine from successive points of the required route beginning with its starting point respective costs of vectors starting at said points and ending at points of possible routes that satisfy preset parameters and lie in the vicinity of said points of the required route, and selecting a suggested route from the plurality of said possible routes that has minimum overall cost, and storing and displaying this suggested route.

15 Claims, 4 Drawing Sheets

(56) References Cited

U.S. PATENT DOCUMENTS

2012/0197714 A1* 8/2012 Beyeler .............. G01C 21/3682
                                                    705/14.49
2014/0282156 A1* 9/2014 Arita .................... G09B 29/106
                                                    715/766

* cited by examiner

METHOD FOR PLANNING A ROUTE IN A SYSTEM WITH A DISPLAY AND AN INPUT DEVICE

The invention relates to a method for planning a route in a system with a display and an input device, in which a map database is used that stores data associated with an area that includes a required route; wherein the map containing the required route or a portion thereof is displayed, and the scale and the position of the displayed map is chosen; then predetermined conditions or preferences associated with the required route are adjusted and stored as route parameters.

Road planning by using a stored map is a generally used activity and forms part of several computer-assisted application programs. In most of the cases the automatic road planning takes place in an automatic way between two or more points (coordinates) by means of a map data base that comprises the data of all streets and roads and other related road characteristics (e.g. name, road quality, direction, etc.). The input of the points can take place by indication on the map (e.g. clicking by a mouse) or by entering and address. In the latter case the program determines first the coordinates of the street with the given name then calculates the suggested route.

The so obtained routes are useful in case of car, pedestrian or bicycle navigations to assist for the user to reach the target.

There are a high number of navigation devices known, and during the road planning with such devices enables for the user to take into account several options. Such options can be e.g. preferences or limitations as to the road (high way, toll ferries, tunnels, etc.), furthermore, the planning can take into account points of interest or services close or along the planned route. When using navigation devices the road is recalculated any time the user gets off the suggested road. Finally there are certain available services that utilize communication channels and suggest automatically escape ways if along the planned route there are accidents or traffic jams or other obstacles. State of the art devices can take further preferences into account e.g. which is the shortest road, which road can be driven with minimum duration, etc. The selection of the mode of the traffic (driving, riding on a bike or walking) is a basic option in most programs.

The development of navigation devices takes place in broadening the choice of options, since the aforementioned options can be adjusted in the majority of existing devices.

In the publication EP 1 491 857 A1 describes additional services that take into account certain maneuvering of the vehicle under navigation and can re-calculate the route depending on the actual maneuvers.

The U.S. Pat. No. 8,306,737 uses specifically interconnected devices in a community area to suggest a route that has optimum fuel consumption.

In these conventional navigation systems the road planning is based on the determination of the matrix of all possible roads between the starting and target points, and the selection among the high number of possible routes is based on the stored user preferences and as a result of the calculation a single or more alternative roads are suggested. The calculation takes into account only the stored possible roads of the map, therefore those points or parts (coordinates) of the map which do not fall on a potential road or street constitute forbidden points that are not considered in the calculations.

In cases where the need of the user in not only to arrive from one point to a target point, but would like to visit during his travel other places, existing applications request information on those intermediate points that fall on a possible road and which the user wishes to cross, and then the calculation will be segmented to road sections.

The publication US 2011/0022308 A1 describes a calculation method, in which the user can draw a required route between a starting point and the target on a map displayed on a touch screen, e.g. by using his fingers. When the required route has been drawn, the co-ordinates of this drawn route will be stored, and a program carries out a search to find the closest roadway road to the required drawn route. The way how this search is carried is described as "the user interface 106 does a piecewise comparison between the coordinates of the approximate route drawn be the user and the coordinates of the actual roadways. The actual road selected by the user interface 106 are the result of minimizing the differences between the coordinates of the actual roads and traced route during the piecewise comparisons" (citation from page 3, column 1, lines 5-11 of the publication). This definition is too vague to enable a man skilled in the art to determined a roadway road which is the closest of all possible roadway roads to the required drawn route, as it is not describer, what pieces of the respective roads are compared and how. In the reality there are roads which might lie close to the drawn route for a while, but then they can change direction and lead away from the drawn route or even they can have a dead end, or there can be one way sections allowing passage in the wrong direction only. The task has been set by this publication but it is silent how the closest way to the drawn route between the starting and end points thereof can be found.

While the publication has mentioned only the finding of the closest route, the user might have different options, like finding the route with minimum or predetermined height difference or avoiding certain types of roads, or the weighted combination of such preferences. The way how these preferences should be taken into account in finding the roadway road that matches to these preferences are not described here, as the freedom of the user to select preferences has also not mentioned in the publication.

When a user draws a requested route, he/she can commit errors or the user can reconsider his preferences after the route drawn by him is displayed. Therefore there is a need to a feature of finding the optimum road to allow the user to modify his requested route before any long and difficult calculations are carried out. Even after a suggested road has been found, the user might not be satisfied with it and wishes to modify it wholly or only in part in an easy way. Such a modification is allowed for the user according to this publication but only to the extent that he can drag a point of the suggested road and can pull it to a point of a roadway road where he wishes the route to extend. The redrawing the requested route without any limitation is not possible according to this publication.

In short: apart from the fact that no enabling disclosure is contained in the publication how the "closest rod" should be determined, from the point of view of ease of use and complying with the rightful wishes of the user, the solution provided in this publication is far from being perfect.

A different, simpler solution is disclosed in the publication US 2007/0260395, according to which the displayed map contains only the possible routes, and the user has given no freedom to draw his fingers on the displayed map from a starting point to a target as he pleases, but the user must move his finger (or his pencil) always along displayed possible routes. This is a simple way, however, it limits the freedom of the user, and he has to take special attention where the possible routes selected by him lead, and if such routes depart from his target, he has to start planning and drawing from the beginning.

For the user the finding of a route according to his preferences along a displayed road system is a rather unpleasant task and he would prefer if the device could give him a suggestion for a route that matches his requirements and preferences.

The road planning algorithms used so far cannot interpret such requirements, because if the user draws his requested or preferred route on a map, then the points of such a requested route will not fall in any stored road or street, i.e. correspond to coordinate points that cannot be interpreted by such programs.

Apart from the problem of determining weighted correlation between a desired route drawn by a user and existing road systems, there exist sophisticated solutions how a shortest route between a starting and a target point can be determined in a road system. Here the roads (more particularly sections thereof between respective waypoint) are represented by respective graphs, and a known algorithm, the Dijkstra algorithm is used to find the shortest way. Such a method is published in the paper of Kevin WAYNE: "Shortest Paths in a Graph=Google maps problem shortest path from Princeton math department to Einstein's house, Slides by Shortest Path Problem=Google maps problem", which are at the website: http://COURSES.CS.WASHINGTON.EDU/COURSES/CSE190X/09SP/SLIDES/S HORTEST-PATHS-ALG.PDF 31 Dec. 2005, XP055161733.

The object of the invention is to improve the conventional route calculating methods in such a way, that an option will be provided for the user to indicate or draw on the map or on a segment thereof between the starting and target points the route along which he would like to travel, and by means of the method a route will be planned for the user which meets with his requests as much as possible and takes also into account his previously entered preferences.

It has been recognized that this object can be reached if during the calculations one has to give up the convention that on the map only those points can be interpreted which fall on a road, and one has to proceed along the requested route from point to point or section to section and to carry out repeated comparisons during this virtual proceeding and in the comparisons the divergence between the required and suggested routes should be at minimum so that the user preferences are also considered.

Such a method requires a different approach and calculations from the conventional ones because it is not sufficient if the device takes into account only the starting and end points (or a few other points) of the required route and to compare them with the plurality of possible routes, but it must also consider points which are outside the plurality of the possible routes.

According to the invention a method has been provided for planning a route in a system having a display and an input device, that comprises the steps of using a map database that stores data associated with an area that includes a required route; displaying the map or a portion thereof on the display, in this displaying step selecting the scale and position of the displayed map; adjusting and storing conditions or preferences as parameters associated with the required route, wherein according to the invention the method further comprises the steps of defining the requested route in which using said input device to draw the required route on the map displayed, storing the coordinate data of the required route; then determining a suggested route based on the required route, wherein an iteration algorithm is used to determine from successive points of the required route beginning with its starting point respective costs of vectors starting at said points and ending at points of possible routes that satisfy preset parameters and lie in the vicinity of said points of the required route, and selecting a suggested route from the plurality of said possible routes that has minimum overall cost, and storing and displaying this suggested route.

Under the term "cost" a voluntarily chosen notion is understood in view of which between two possible route points one meets in a more preferred way with the preferences of the user. In the most simple case such can be the minimum distance between a required route and a possible route, then the minimum duration for travelling along the route, or if the user does not wish to exceed a predetermined height difference, then the preferred route will be where the height difference is satisfactory.

In a preferred embodiment the previously suggested route or a part thereof is modified so that on said suggested route the point is defined from which a route modification is desired and a required modified route or a section thereof is drawn on the displayed map, and in the route calculation the pervious iterative route determining steps are repeated so that this required modified route is taken into account and the suggested modified route is calculated and determined.

It is preferred if respective areas on the display are assigned for entering a "route planning" and a "route modifying" functional mode, and the required mode is selected by activating the area associated with the required mode.

In the most often required applications it is preferable if such preferences are chosen alone or in combination which re the shortest route, the route that can be taken in the shortest time and a route that has minimum height difference.

In addition to road planning it is advantageous to also provide a navigation service when the user takes the suggested planned route.

The simplest way of carrying out the method is when the display and the input device are made of a touch screen.

Form the point of view of carrying out the method it is preferred if the system used as an off line system which is independent from any remote database and the operation does not require any outside data-communication.

The method according to the invention will now be described in connection with preferable embodiments thereof, in which reference will be made to the accompanying drawings. In the drawing.

Figure 1:
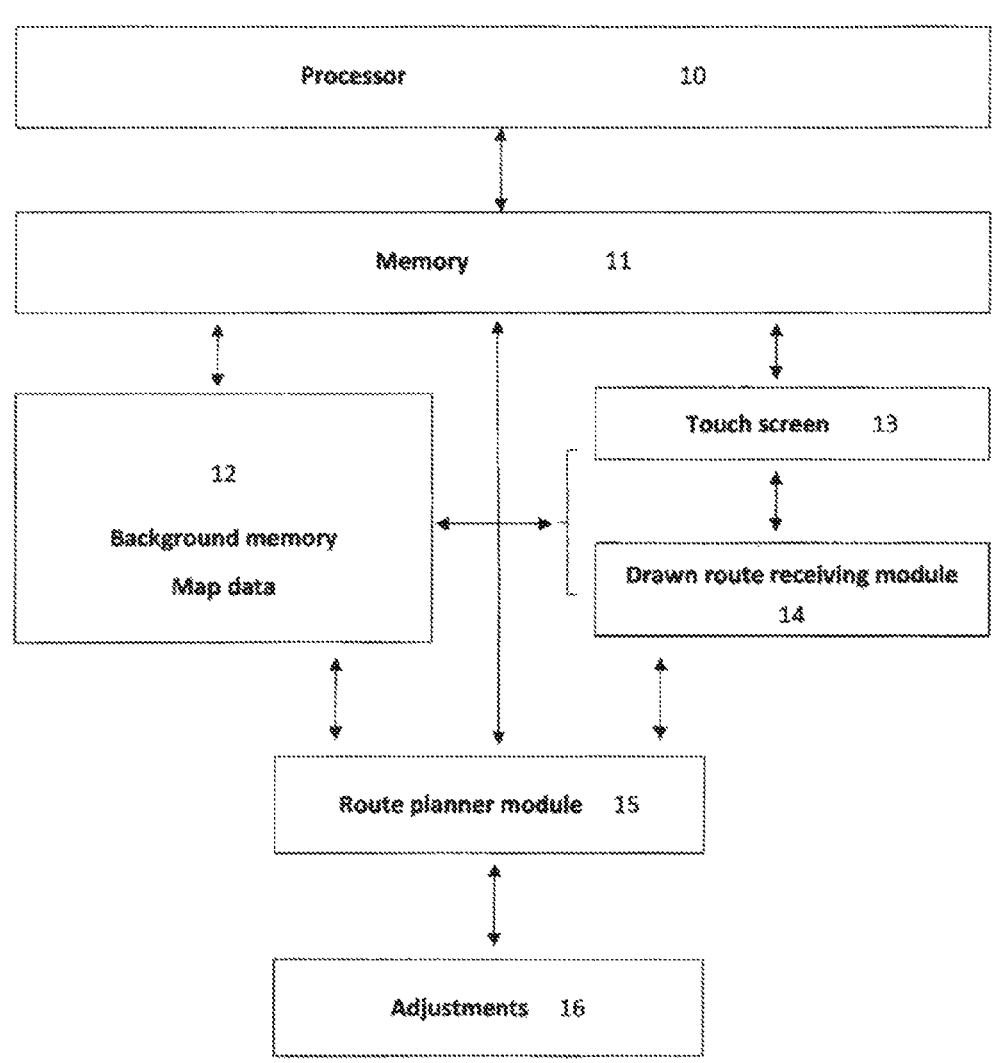
FIG. 1 shows the block diagram of a device by which the method can be carried out.

With reference to the drawings examples will be provided how conventional route-planning methods are complemented in such a way that a possibility is provided for the user to directly draw a required route on a map displayed on a screen which is positioned by the program on the map underneath. During the positioning step the program tries to plan a route which takes into account the previously adjusted parameters which extends from a starting point to the target and tries to follow the route drawn by the user.

In case of conventional screens the drawing of the route on the screen can be carried out by a mouse or by a digitizing table, while in case of touch screens directly by its use.

FIG. 1 shows the schematic block diagram of a device 1 for carrying out the method according to the invention which comprises per se known functional units, namely it comprises a processor 10, a memory 11 connected to the processor, and a background memory 12 shown as a separate unit that stores the map data. The term "map data" includes e.g. the road data and road properties, and data corresponding to establishments on the given map segment which are supposed to be available in a digital form and with a satisfactory resolution. The device 1 comprises a display which is constituted in the exemplary embodiment by a touch screen 13 on which a selected portion of a map can be displayed with the required scale. At the same time the touch screen 13 serves also as an input device.

A drawn route receiving module 14 is connected to the touch screen 13, to the background memory 12, to the processor 10 and to the memory 11, and the module 14 makes it possible that in a route drawing mode the user can move one of his fingers above the map to determine a preferred route, then this route be stored in a separate portion of the memory 11.

The route receiving module 14, the aforementioned separate portion of the memory 11 and the background memory 12 that contains the map data are all connected to a route planner module 15 that has a task to generate a planned route as a result of taking into account the drawn required route, the stored existing routes and the route preferences of the user.

An adjustment module 16 provides assistance to the user to input his wishes and preferences in the device with a simple way.

Figure 2:
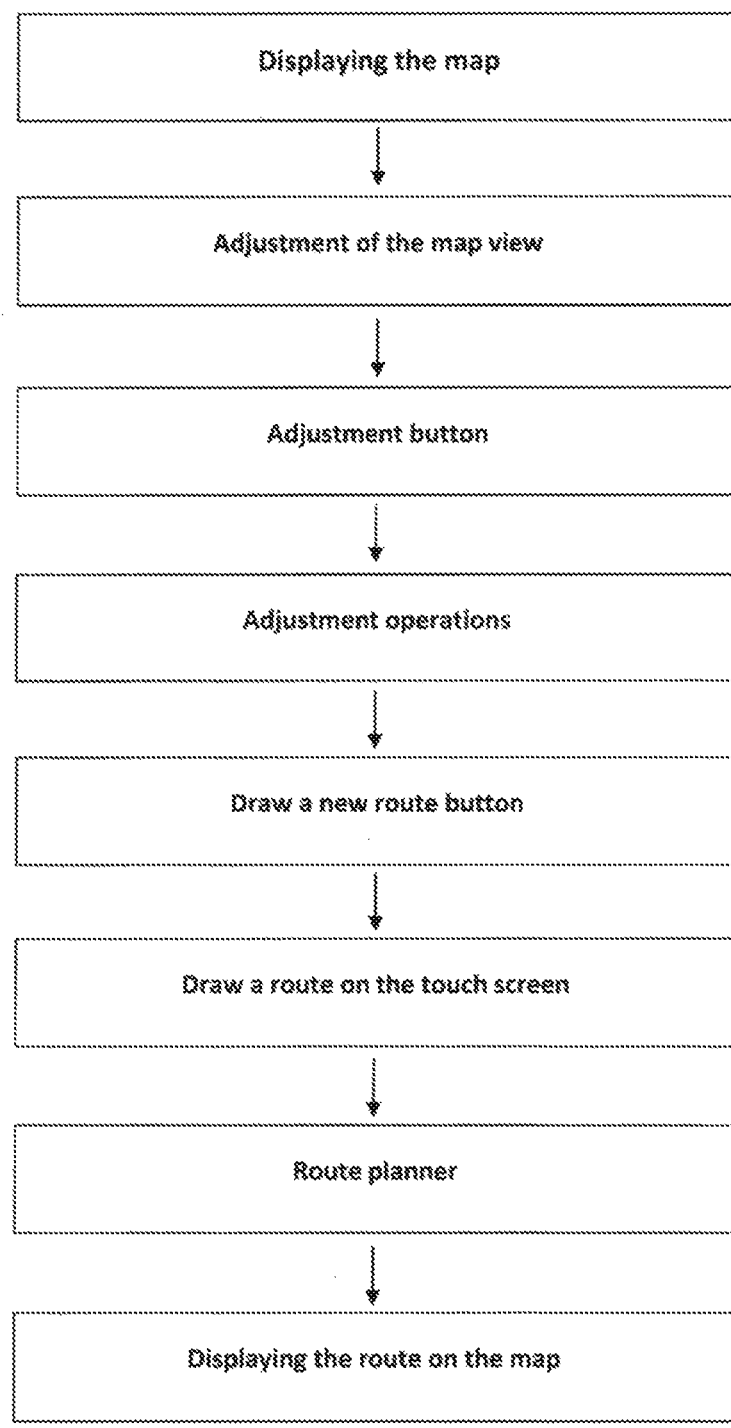
FIG. 2 shows a flow chart showing the steps of the drawing of a route.

FIG. 2 shows a simplified flow chart of drawing a new route and of the operation of the device. In a first step a map is displayed on the touch screen 13. This can be done by utilizing certain conventional input functions, namely the keys + and − serve to enlarge or to decrease the displayed map as required. The position of the given map detail can be shifted in several directions by using four keys associated with the four directions, or using a function when the user places his finger for a longer period in the momentarily displayed map segment, then by shifting the finger in any direction, the map is shifted together with the finger as longer as it releases the screen.

After the display of a given map portion the user can utilize the "adjustments" function that suggest a large number of options, e.g. the user can define the kind of the vehicle (car, bicycle, on foot or on horse) to reach the target, then he can input his road preferences which option have already be mentioned. Following the input of the selected options the user places one of his fingers or an appropriate tool to the starting point on the map, then moves it along the required route on the stationary map. The target will be the point where the user raises his finger from the map. The path of the selected route will then become visible on the screen. Prior to storing the route there is a possibility for the user to modify the path, in case he is dissatisfied with it or with a portion thereof and would like to enter corrections. When the drawing of the required path has been finished and the user has accepted it, then the data of the required path will be received and stored by the route receiving module 14 shown in FIG. 1 which stores these data in a delegated part of the memory 11.

The second operational step is the route planning, which is carried out by the route planning module 15 by taking into account the adjusted preferences and by associating the stored required route with the possible routes stored in the background memory 12. The result of this operation is the planned suggested route which is displayed on the screen.

The method according to the invention will be explained in connection with a route planning operation illustrated in FIGS. 3 to 7.

Figure 3:
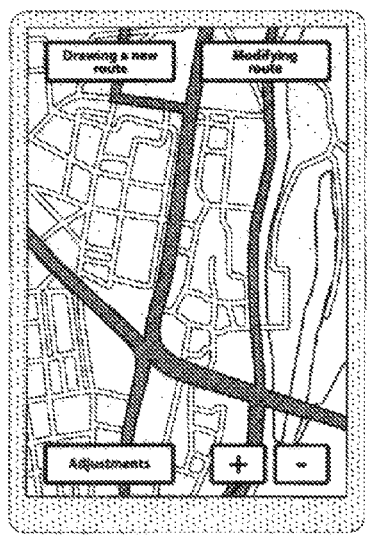
FIG. 3 shows an exemplary layout of the input elements on a touch screen.

FIG. 3 shows a mobile device with a touch screen, which is sensitive to the touch of a human finger or of a specific pen. First the user adjusts the displayed map to the required scale and position by using the functions: enlargement or downscaling or by shifting the whole map in a direction. When the button "+" is pressed, a closer picture is obtained from the map, while the pressing of the button "−" the picture will have a larger scale to allow the display of larger areas.

If the user touches a point on the screen and while pressing the screen moves the finger in a direction, the map will follow the movements and gets shifted therewith because the point contacting the finger remains always under the finger. When the user raises his finger from the screen, then the map will remain in its last position. The map can be laterally shifted by this technique.

The objective of the user is to plan a path on the map by drawing where he would like to go but leaves the accurate and detailed planning to the device.

The preferences of the user concerning the route can be defined after pressing the button "adjustments" and selecting among the displayed options. In an example he can choose among the following parameters:

1. Type of the road (car, bicycle or on foot)
2. Type of planning (optimized to duration, to distance or to height difference)
3. Other conditions (e.g. avoiding highways or toll routes or ferries).

After the user has adjusted the required scale and planning options, for starting the drawing of the required route he presses the button "draw a new route" that brings the device in path drawing mode. In this mode the route receiving module 14 sown in FIG. 1 is activated, and the meaning of the movement of a finger along the screen gets changed from the previous step when the map was adjusted. In drawing mode the user can draw any path on the screen which is similar when we draw a line with a pencil on a sheet of paper. In case of using a (non-touchable) screen, the drawing of the route on the map can also be carried out be a mouse or by a digitizer table, while in case of touch screens by finger movements.

Figure 4:
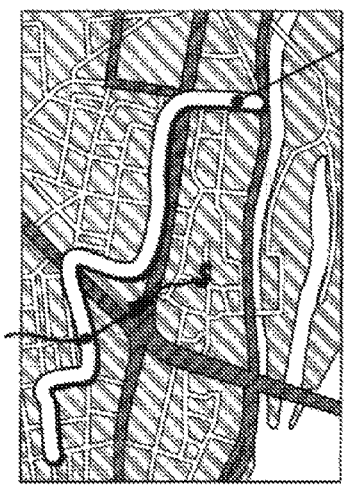
FIG. 4 shows the touch screen with a drawn "required route"

While the user draws a line on the screen and hold the screen pressed, the program simultaneously displays the line on the screen to provide a feedback to the user on the actual status of the drawing. The user can finish drawing by raising his finger from the screen. Then he will automatically exit from the drawing mode. FIG. 4 shows a required path made in the here described way. For the sake of simplicity the case when the user has drawn a wrong or less desired route which he wishes to modify will not be explained here. Such a possibility will be provided by using the function key "modify route".

After the exit from the route drawing mode the program stored in the route planning module 15 starts planning the route by processing the previously set adjustments and the required path drawn. The route leads in all cases from the start point to the target and satisfies the adjusted options so that it tries to find routes which are close to the drawn required path.

During this planning operation the program stores from the map data base stored in the background memory 12 so called map graph data, which are used by the module 15 to find a route. The route planner module defines path sections based on the preferred options entered previously in the adjustment mode and of a map band defined around the geometrical coordinate data of the required route. For planning the route the known Dijkstra algorithm (or a modified version thereof) is used which is probably a standard in this field.

When the algorithm is running to respective points of the required route respective graphs are associated which have one end falling on a point v of the required route, whereas a different apex point s falls on a road along which the pre-selected vehicle can move. The task is to find a suggested route determined by the plurality of the point s and taking into account the selected options. For making the search a term "cost" is introduced and respective costs can be associated with each of the graphs, and it is a quantity which satisfies the pre-selected options in a closest way. In the simplest case the task is to find a possible route which extends in the shortest distance from the required route. In that was the graph starts on the required route and ends on a possible route, and the cost is the distance of these two points. The shorter this distance is the lower the associated cost will be. Instead of the distance the term cost can also represent the height difference or a weighted amount of the distance and of the height difference. By using the algorithm the range of point s will be defined that fall on possible routes and have minimum cost. Obviously to every point v a plurality of points s can be associated, however, of them only one will have minimum cost. More accurately, the calculations are repeatedly carried out for the points of the required route, therefore the position of points s can be determined after the calculations for the whole route has been made. This is understandable because a route segment which looked like optimum at the beginning may change direction later or can become a dead end route so that this cannot be selected any more, as its cost will suddenly jump there. The use of repeated iterative calculations for establishing the minimum of the costs makes it possible to obtain a planned route which will be close to the required route and which also satisfies the adjusted preferences. When calculating the costs of the edges of the graph sections the distance from the route required and drawn by the user will always be a weighing component.

After the planning module has finished its job, the so obtained planned or suggested route will be displayed on the map. Optionally the device can also contain a navigation module which assists passage of the user along this planned route by providing visual and/or voice directions and using his momentary position coordinates.

Figure 5:
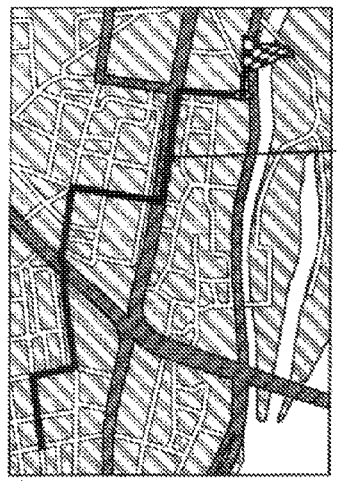
FIG. 5 is a view similar to FIG. 4 which shows the planned route.

FIG. 5 shows the planned route calculated from the desired route shown in FIG. 4, which follows with a good approximation the path defined by the user. In a city the existence of several one way roads and of the numerous traffic regulations the planned route will always depart from the required route, but if other routes were tried they would provide always worse results.

It is important to note that currently there is no such a known route planning algorithm which would take a required route drawn by the user as a weighing condition in the route calculation operation. At the same time this also means that up to the present there has not been any other way which could provide an alternative solution for this task.

When the user first look at the suggested planned route, in several cases he is dissatisfied with the route or a portion thereof and will rather wish to modify his original required route. The present method provides this possibility by having a "modify route" function. For starting a route modification the user presses a button visible on his screen, named "modify route", and the device will get again into route drawing mode just as when a new route was defined.

When drawing a modified route, the user has to follow the principle that the program can modify the route if the start point of the modified route (or a section thereof) is the same (or very close to it) as that was in the previous case. If both the start and end points of a required and a modified route section are unchanged (or they are very close), then only the section between these two points will be recalculated, and other parts of the planned route will remain the same. If the end point of the newly drawn route section is not close to the end point of the previous route, then the planned route will start to depart from the previously planned one starting from the beginning of the departing section.

The user can finish drawing by raising his finger from the screen, whereby he automatically exits from the modifying mode.

After such an exit the program automatically starts the planning of the new route based on the adjusted preferences and of the modified drawn route. The planning uses the same principles as earlier.

Figure 6:
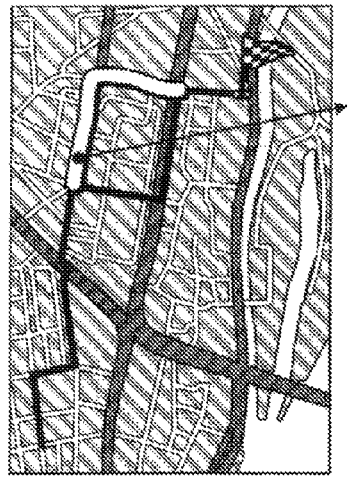
FIG. 6 shows a hand drawn modification request with respect to the planned route and FIG. 7 shows a modified route planned according to the request of FIG. 6.
Figure 7:
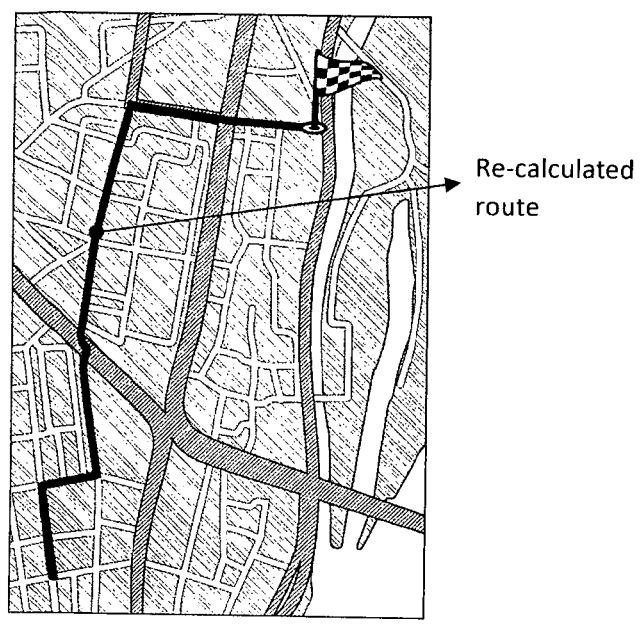

When the program has finished the recalculation of the route, the result obtained is displayed on the map. This is illustrated in FIG. 6 where the modifications made by the user with respect to the previously planned route are shown. FIG. 7 shows the recalculated route that has taken into account the modifications of the user.

The method according to the invention has been shown in connection with using a touch screen device. A man skilled in the art can easily appreciate that in certain cases the display and input devices can be separate. Such are e.g. the "white board" applications where the display function is performed by projection or in a different way on the surface of a board, and the user draws the required route on the map shown on the board by any appropriate tool e.g. by a pencil, a rod or by using his own fingers.

A different way for the display is using a Google Glass or a similar device that generates a virtual image and using a separate input tool to indicate the require route in the virtual space.

Based on the foregoing it can be understood that the device has stored all information and data required for carrying out the method, therefore it is an off-line or stand alone device because its operation does not require downloading data through the net or from the cloud. Of course this feature is not an indispensable property as map data can always be downloaded from outer data bases, but the dependence from outside data decreases the degree of freedom of the user.

The method according to the invention represents a new dimension of route planning because there are several users who are not only interested in moving from a point A to point B, but positively care about the properties of the route between these points including the landscapes, scenery and other subjective preferences.

What is claimed is:

1. A method for planning a route in a system having a display and an input device, comprising the steps of using a map database that stores data associated with an area that includes a required route; displaying the map or a portion thereof on the display, in said displaying step selecting the scale and position of the displayed map; adjusting and storing conditions or preferences as parameters associated with the required route, characterized by further comprising the steps of defining the requested route in which using said input device to draw the required route on the map displayed, storing the coordinate data of the required route; then determining a suggested route based on the required route, wherein using an iteration algorithm to determine from successive points of the required route beginning with its starting point and ending at points of possible routes that satisfy said preset parameters and lie in the vicinity of said points of the required route, and selecting a suggested route from the plurality of said possible routes that has minimum overall cost, and storing and displaying said suggested route.

2. The method as claimed in claim 1, further characterized by the steps of planning a modified suggested route or a part thereof so that defining on said suggested route the point from which a route modification is desired and indicating a required modified route or a section thereof on the displayed map, and repeating said iterative route determining step by taking said required modified route into account and determining a suggested modified route.

3. The method as claimed in claim 2, wherein assigning respective areas on the display for entering a "route planning" and a "route modifying" functional mode, and selecting the required mode by activating the area associated with the required mode.

4. The method as claimed in claim 1, characterized by choosing as preferences alone or in combination the shortest route, the route that can be taken in the shortest time and a route that has minimum height difference.

5. The method as claimed in claim 1, characterized by providing a navigation service when taking the suggested planned route.

6. The method as claimed in claim 1, wherein said display and said input device are made of a touch screen.

7. The method as claimed in claim 1, wherein said system is an off line system.

8. A method for planning a route in a system having a display and an input device, comprising the steps of using a map database that stores data associated with an area selected by the user in which he/she wishes to draw a required route, said data include existing roadway routes and coordinate data of the area; displaying the map or a portion thereof on the display, in said displaying step selecting the scale and position of the displayed map; using said input device by the user to draw a requested drawn route on the displayed map, and storing the requested drawn route in the device; then determining and displaying a suggested route based on the required drawn route, characterized by further comprising the steps of prior to said determining step of the suggested route storing conditions or preferences selectable by the user as parameters to be taken into account in said determining step, said preferences comprise the type of the road and type of planning including optimization to duration, distance or height difference, and allowing the user to set his/her preferences before the determining step is carried out, storing the coordinate data of the required drawn route; wherein in said determining step using the disjkstra iteration algorithm to determine from successive points (v) of the required route respective costs of graphs starting at said points (v) and ending at different points (s) on said existing roadway routes, wherein said cost is defined by said previously set preferences, determining overall costs to said roadway routes and selecting the suggested route that has minimum overall cost, and storing and displaying said suggested route.

9. The method as claimed in claim 8, further characterized in that prior to storing the requested drawn route, allowing the user to fully or partially modify the requested drawn route and carrying out said storage step of the requested drawn route when the user has indicated acceptance thereof.

10. The method as claimed in claim 8, further characterized by the steps of following the display of the suggested route allowing the user to activate a modification mode in which the user can draw a full or partial modification of the route, and said determining step is carried out again for the so modified route and a new suggested route is defined.

11. The method as claimed in claim 8, wherein assigning respective areas on the display for entering a "route planning" and a "route modifying" functional mode, and selecting the required mode by activating the area associated with the required mode.

12. The method as claimed in claim 8, wherein the previously set preference is a combination of the shortest route, the route that can be taken in the shortest time and a route that has minimum height difference selected by the user.

13. The method as claimed in claim 8, characterized by the step of providing navigation along the suggested route.

14. The method as claimed in claim 8, wherein said display and said input device are made of a touch screen.

15. The method as claimed in claim 8, wherein said system is an off line system.

* * * * *